W. LARRABEE.
Grain Separator.
No. 36,301.  Patented Aug. 26, 1862.
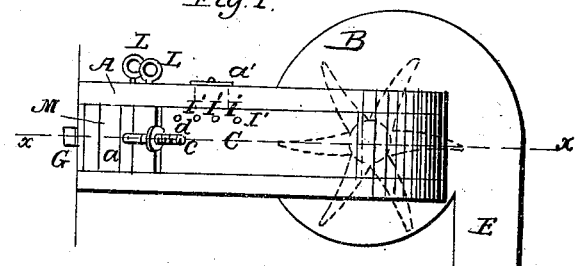
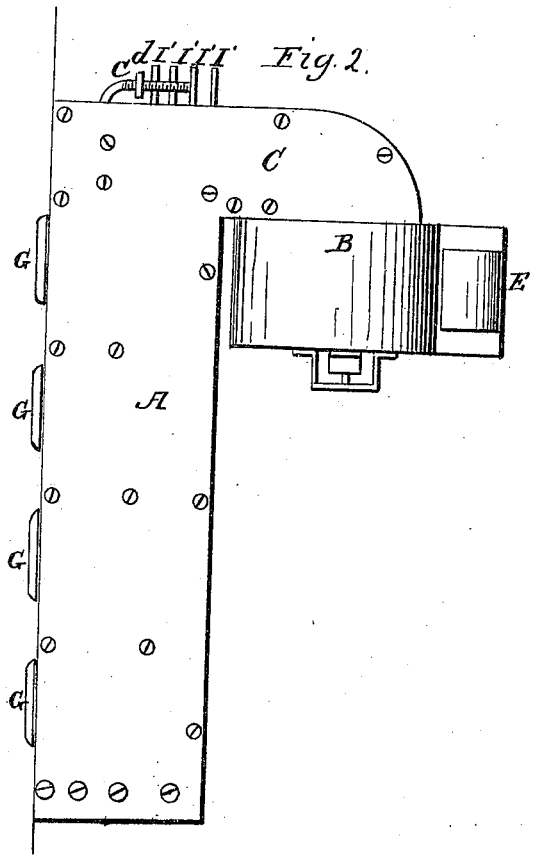
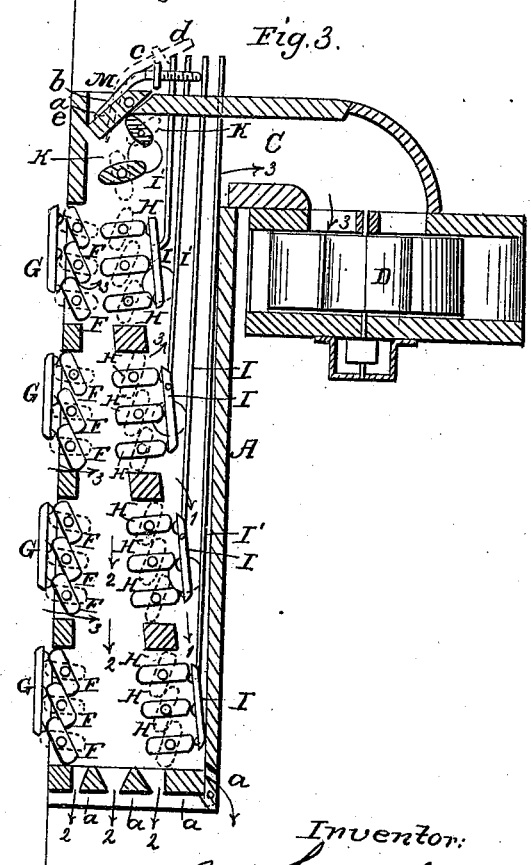
Witnesses:
Inventor:

UNITED STATES PATENT OFFICE.

WILLIAM LARRABEE, OF CLERMONT, IOWA.

IMPROVEMENT IN GRAIN-WINNOWERS.

Specification forming part of Letters Patent No. 36,301, dated August 26, 1862.

*To all whom it may concern:*

Be it known that I, WILLIAM LARRABEE, of Clermont, in the county of Fayette and State of Iowa, have invented a new and Improved Grain-Separator; and I do hereby declare that the following is a full, clear, and exact description of the same, reference being had to the accompanying drawings, making a part of this specification, in which—

Figure 1 is a plan or top view of my invention. Fig. 2 is a side elevation of the same. Fig. 3 is a vertical section of the same, taken in the line *x x*, Fig. 1.

Similar letters of reference indicate corresponding parts in the several figures.

This invention consists in the employment or use of an upright spout having a fan connected with it at its upper end, so as to cause or produce a suction-blast therein, in connection with a series of valves arranged in such a manner with the spout as to produce lateral draft-entrances and insure a perfect separation of all light impurities from the grain, and also the perfect separation of wheat from oats, &c.

To enable those skilled in the art to fully understand and construct my invention I will proceed to describe it.

A represents an upright spout, to the upper part of which a fan-box, B, is connected by a horizontal box or passage, C. Within the box B a fan, D, of the usual construction, is placed. The fan-box B is provided with a discharge-spout, E, and the bottom of the spout A has grain-discharge openings *a* made in it, as shown in Fig. 3.

In one side of the spout A there is placed a series of valves, F. These valves are arranged in series of three, more or less, like the slats of a window-blind, to wit: one being placed over the other, and the valves of each series connected by staples or links to a bar, G, by adjusting which each series may be moved, opened, and closed simultaneously, and one series independently of the other.

Within the spout A there are also placed a series of valves, H, which, when closed, form a partition within the spout that is sliightly inclined, as shown clearly in Fig. 3. The bars I of the valves H have each a rod, I', connected to them, and these rods I' extend up through the top of the spout A, so that each series of valves H may be adjusted (opened and closed) separately. This will be fully understood by referring to Fig. 3. Directly above the uppermost valve H there are placed two independent valves, K K, which are adjusted or turned separately by rods L L, which extend through the side of the spout A.

M represents a hopper, which is at the top of the spout A, and has one side, *a*, hung on a pivot, *b*. This side *a* has a rod, *c*, attached to it, on which an adjustable upright, *d*, is placed. This weight, by being properly regulated, renders the hopper self-adjusting—that is to say, the hopper will close when there is no grain in it. The upper valve K, by being adjusted, will regulate the descent of the side *a*, as may be required, as shown in Fig. 3. The lower valve K serves to distribute the sheet of grain or spread it so that it will fall in a thin sheet down between the valves F H. This lower valve also regulates a lateral current of air through a side opening, *e*, in the spout A, as shown in Fig. 3. The grain, in passing from the hopper down between the valves F H from the lower valve K is subjected to later drafts or blasts passing between or through the valves F H, the strength of which drafts or blasts may be regulated as desired by adjusting the valves. The dust and light foreign substances are drawn through the valves H upward in spout A, and through the passage C into the fan-box B, and ejected therefrom through the spout E. The oats and chess are also drawn through or between the valves H, but are too heavy to follow the lighter substances up in the spout A, and are discharged through the opening at the bottom of spout A, as indicated by arrows 1. The sound grain (wheat) is discharged at the openings *a*, (indicated by the arrows 2.) The arrows 3 indicate the passage of the dust and light impurities through the machine. The lateral drafts through or between the valves are very efficient in separating long foreign substances, such as straws, oats, &c., far more so than a direct upward blast alone.

I would remark that the position of the valves H may be observed by openings in one side of the blast-spout, said openings being provided with covers *a'*.

Having thus described my invention, what I claim as new, and desire to secure by Letters Patent, is—

1. The upright suction blast-spout A, in combination with the valves F H, arranged as shown, and the fan D, as and for the purpose herein set forth.

2. The supplemental valves K K, adjustable hopper M, and draft-passage e, when arranged and combined with the valves F H, as and for the purpose herein set forth.

WM. LARRABEE.

Witnesses:
F. S. PALMER,
A. H. LOOMIS.